(12) United States Patent
Wolfrum

(10) Patent No.: US 12,377,717 B2
(45) Date of Patent: Aug. 5, 2025

(54) MOTOR VEHICLE WITH A SIDE DOOR

(71) Applicant: Bayerische Motoren Werke Aktiengesellschaft, Munich (DE)

(72) Inventor: Stephan Wolfrum, Hebertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/709,117

(22) PCT Filed: Nov. 7, 2022

(86) PCT No.: PCT/EP2022/080904
§ 371 (c)(1),
(2) Date: May 10, 2024

(87) PCT Pub. No.: WO2023/099118
PCT Pub. Date: Jun. 8, 2023

(65) Prior Publication Data
US 2025/0001843 A1    Jan. 2, 2025

(30) Foreign Application Priority Data
Dec. 2, 2021  (DE) ............... 10 2021 131 706.1

(51) Int. Cl.
*B62D 25/16*        (2006.01)
*B60J 5/04*         (2006.01)

(52) U.S. Cl.
CPC .......... *B60J 5/0418* (2013.01); *B60J 5/0413* (2013.01); *B60J 5/0415* (2013.01); *B62D 25/16* (2013.01)

(58) Field of Classification Search
CPC ...... B60J 5/0418; B60J 5/0413; B60J 5/0415; B62D 25/165; B62D 25/161; B62D 25/16
See application file for complete search history.

(56) References Cited

U.S. PATENT DOCUMENTS

| | | | | |
|---|---|---|---|---|
| 5,446,999 A | * | 9/1995 | Inaba | B60J 5/0469 49/502 |
| 10,967,717 B2 | * | 4/2021 | Sasaki | B60J 10/36 |
| 2011/0115253 A1 | * | 5/2011 | Kishi | B62D 25/161 296/151 |

FOREIGN PATENT DOCUMENTS

| | | |
|---|---|---|
| DE | 44 08 287 A1 | 1/1995 |
| DE | 100 31 375 A1 | 1/2002 |

(Continued)

OTHER PUBLICATIONS

JP2012096701A English Translation from WIPO (Year: 2014).*

(Continued)

*Primary Examiner* — Daniel J Troy
*Assistant Examiner* — Susan M. Heschel
(74) *Attorney, Agent, or Firm* — Crowell & Moring LLP

(57) ABSTRACT

A motor vehicle has a side door which has a door inner panel on the motor vehicle interior side and a door outer skin on the motor vehicle outer side. The door inner panel and the door outer skin are joined together at least in some sections in an edge region of the side door in order to form a butt joint, wherein a gap can be formed between the door inner panel and the door outer skin in the edge region at least partly on the basis of tolerances in a Y direction and/or an X-Z direction, and a seal element is provided which can be secured to the door inner panel by securing elements, extends over the edge region, and sealingly lies against the exterior of the door inner panel and the door outer skin in each case. The seal element is made of a hard component which extends along the edge region, and a soft component is arranged on the hard component solely on the door inner panel side and the door outer skin side, said soft component sealingly lying against the exterior of the door inner panel (Continued)

and the door outer skin in each case so as to adjoin the edge region when the seal element is secured.

13 Claims, 4 Drawing Sheets

(56) References Cited

FOREIGN PATENT DOCUMENTS

| DE | 103 34 143 A1 | | 2/2004 |
|---|---|---|---|
| DE | 10 2004 050 074 A1 | | 4/2006 |
| DE | 10 2004 053 610 A1 | | 5/2006 |
| DE | 10 2018 118 995 A1 | | 3/2019 |
| JP | 2012-96701 A | | 5/2012 |
| JP | 2012096701 A | * | 5/2012 |

OTHER PUBLICATIONS

International Search Report (PCT/ISA/210) issued in PCT Application No. PCT/EP2022/080904 dated Feb. 28, 2023 with partial English translation (6 pages).
German-language Written Opinion (PCT/ISA/237) issued in PCT Application No. PCT/EP2022/080904 dated Feb. 28, 2023 with English translation (8 pages).
German-language Search Report issued in German Application No. 10 2021 131 706.1 dated Jul. 19, 2022 with partial English translation (13 pages).

* cited by examiner

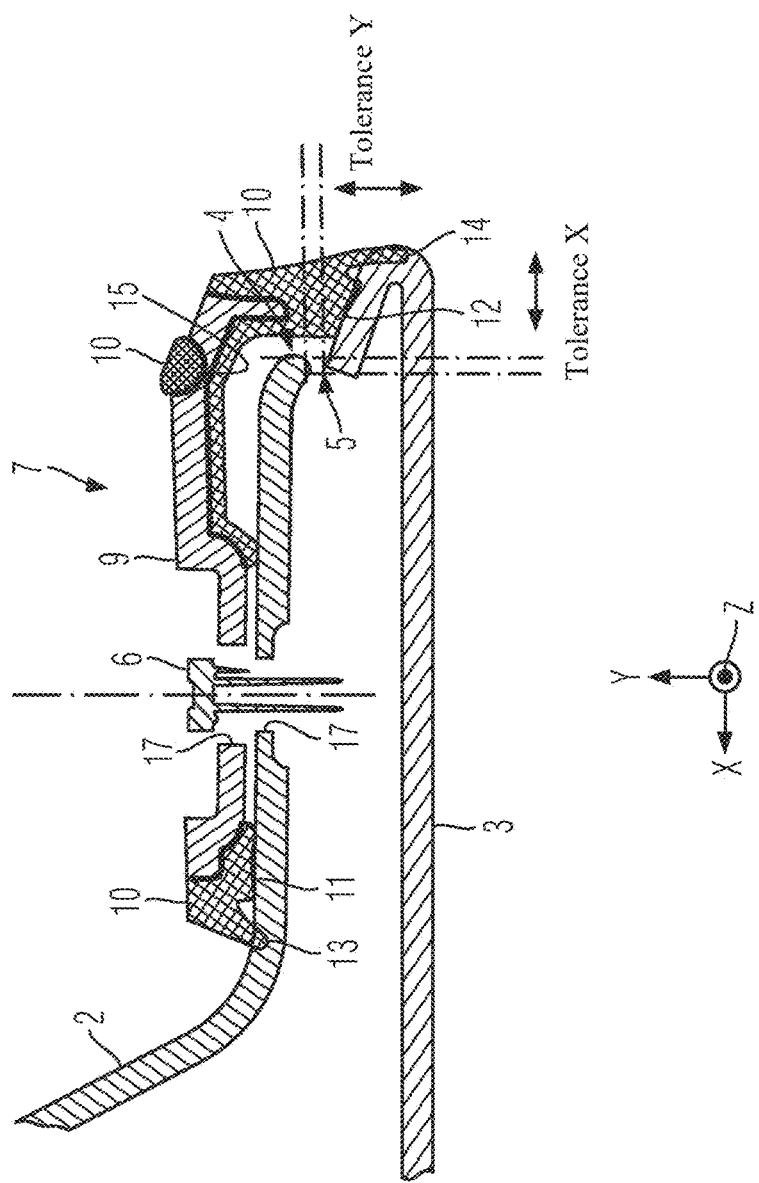
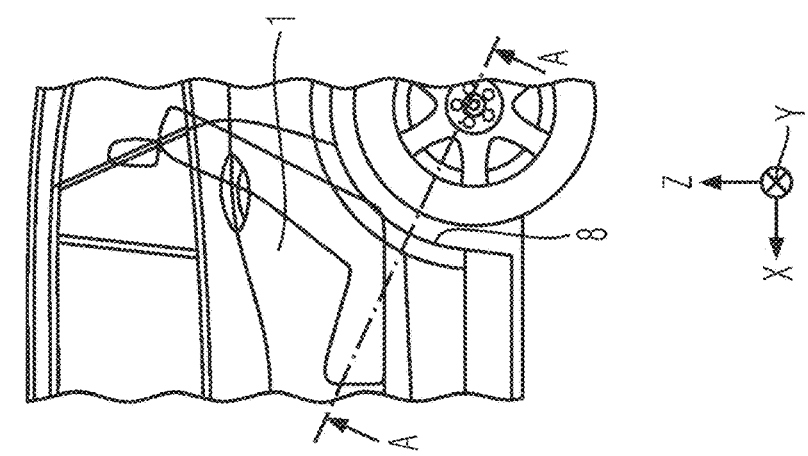

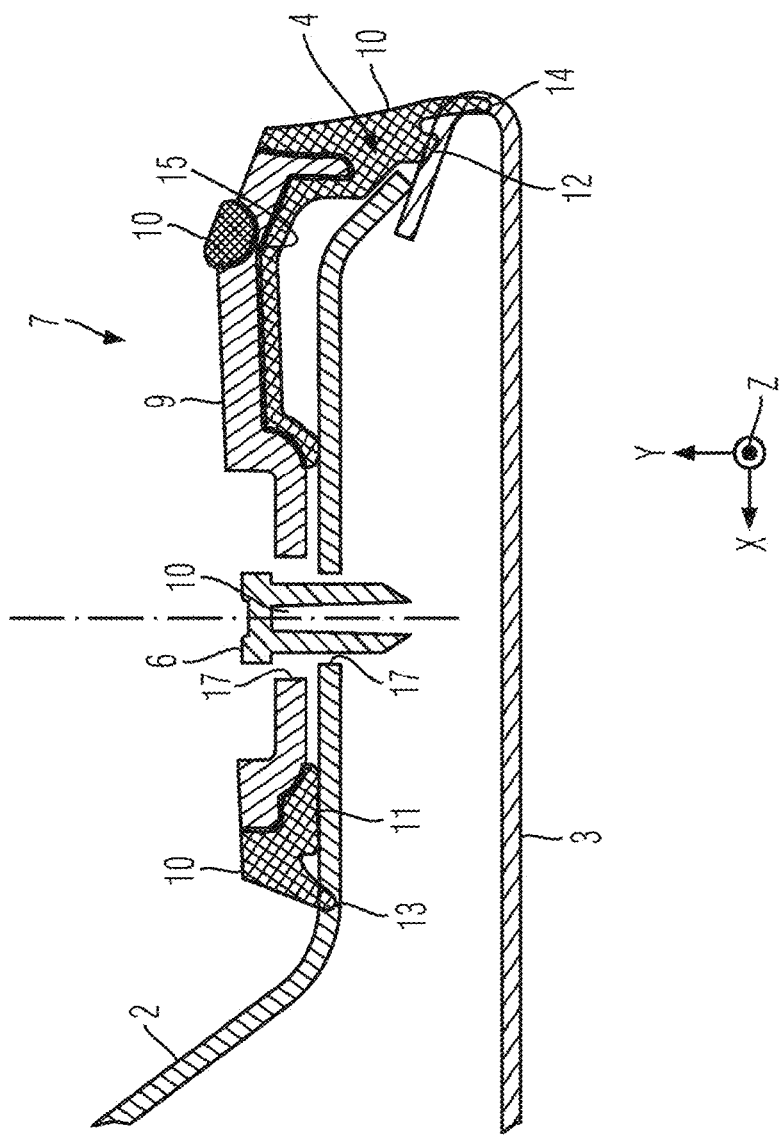

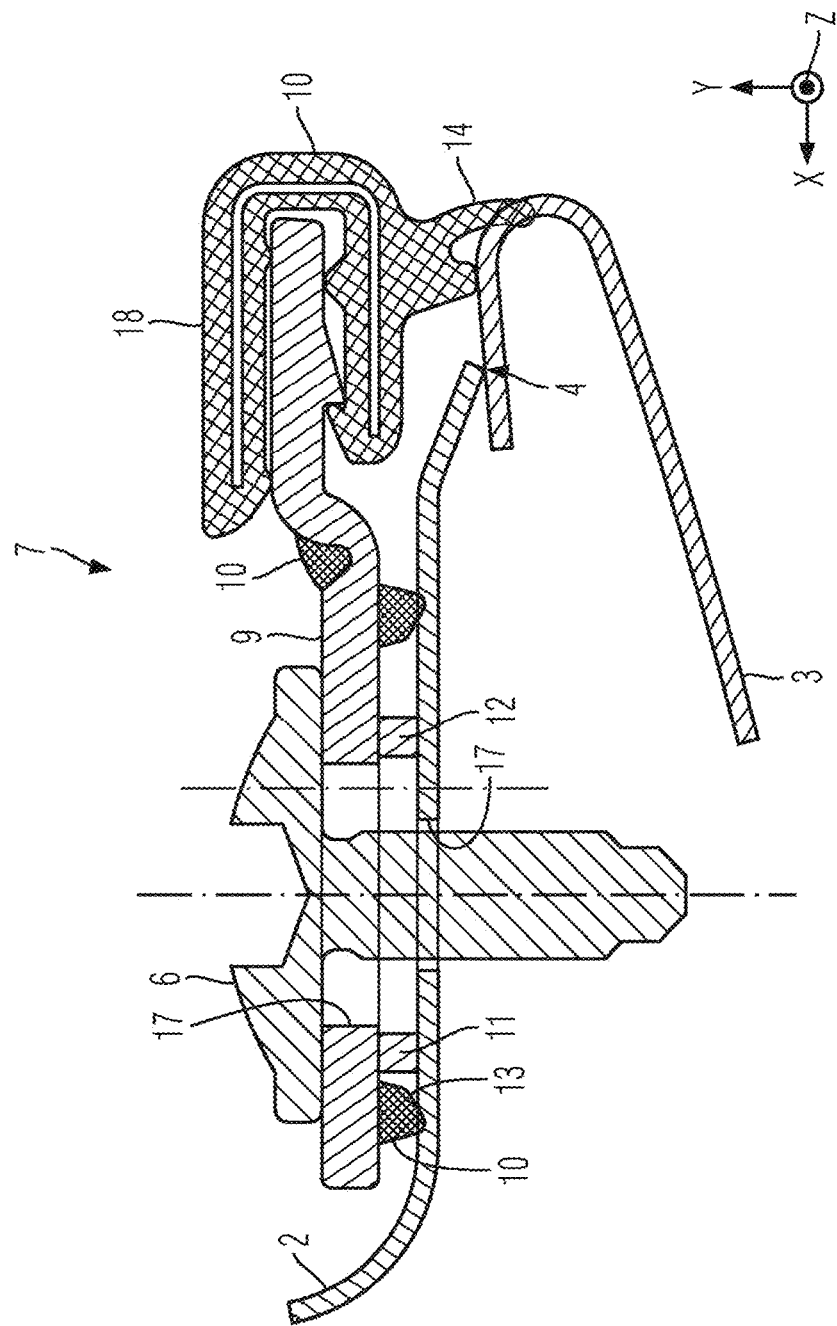

MOTOR VEHICLE WITH A SIDE DOOR

BACKGROUND AND SUMMARY

The invention relates to a motor vehicle having a side door which has a door inner panel on the motor vehicle interior side and a door outer skin on the motor vehicle outer side. The door inner panel and the door outer skin are joined together at least in some sections in an edge region of the side door in order to form a butt joint.

With regard to the technical background, for example, reference may be made to the German patent document DE 103 34 143 A1. This document discloses a motor vehicle door having an external sub-assembly which has an outer door skin and which forms an outer design face of the motor vehicle door, and having a unit carrier which is arranged at a side of the external sub-assembly facing the vehicle interior and which is connected to the external sub-assembly with an interface being formed. It is proposed that along the interface of the unit carrier and external sub-assembly there extends a seal which at least partially covers the interface.

The German patent document DE 10 2004 050 074 A1, on which the present invention is based, further discloses another vehicle door. A vehicle door is described, in particular for a motor vehicle, having an outer door skin and a door base element which is intended to be connected to the vehicle, which are releasably connected to each other at the upper, lower, front and rear edges thereof. The door base element has at the upper edge thereof a suspension element and at the front edge thereof a groove. The outer door skin is configured at the upper edge thereof to be substantially U-shaped in cross section and suspended in the suspension element, and has at the front edge thereof a protuberance which is in engagement with the groove of the door base element. The rear and lower edges of the door base element and the outer door skin are in each case connected to each other by means of at least one securing means. Furthermore, on the front edge of the door base element, a joint seal is provided, wherein the joint seal has the groove.

The disadvantage of this known edge protection is that it is cost-intensive and visually not particularly appealing.

An object of the present invention is to provide a cost-effective edge protection for a side door of a motor vehicle, by means of which tolerances between the joined components are also compensated for.

This object is achieved for a generic motor vehicle having a side door according to the invention in that the sealing element is formed from a hard component which extends along the edge region and in that there is arranged only at the inner door panel side and at the outer door skin side on the hard component a soft component which is positioned in a sealing manner on the inner door panel and the outer door skin in each case at the outer side, adjacent to the edge region in the secured state of the sealing element.

As a result of the configuration according to the invention of the motor vehicle having a side door, a cost-effective, effective protection for the edge region of the side door is constituted and occurrences of flaking paint and corrosion are advantageously avoided. Furthermore, tolerances between the inner door panel and the outer door skin are also compensated for. The outer door skin may, for example, in the same manner as the inner door skin, be formed by a metal sheet or by a plastics material or a material mix. The hard component is intended to be understood to be, for example, polypropylene (PP). The soft component is intended to be understood to be, for example, a thermoplastic polymer (TPE) or a rubber material, such as, for example, ethylene-propylene-diene rubber (EPDM).

As a result of the configuration according to an aspect of the invention, in which the outer door skin is flanged in the edge region at the side facing the inner door panel, a cost-effective sealing is also constituted for flange edges for a side door.

In an embodiment in which the soft component is positioned at least partially in abutment against the inner door panel with a first base and against the outer door skin with a second base along the edge region, a defined installation position for the sealing element is achieved. In another exemplary embodiment, the first base and/or the second base may also extend continuously along the sealing element. This embodiment increases the mechanical strength of the sealing element.

In the embodiment in which the soft component has, adjacent to the first base, a first sealing lip which has on the inner door panel and/or adjacent to the second base a second sealing lip, which is positioned at least partially in a sealing manner on the outer door skin and which extends along the edge region, a penetration of dirt, dust and, in particular, liquid into the edge region is prevented. Consequently, a particularly good corrosion protection, for example, protection against, for example, stone chipping, is advantageously provided.

As a result of a further embodiment in which the hard component has a material weakening along the edge region in the region of the joint of the inner door panel and outer door skin at the side facing away from the inner door panel, the sealing element can be adapted in a particularly simple manner to the three-dimensional contour of a side door of a motor vehicle.

With the embodiment in which the material weakening is at least partially filled with the soft component, the stability of the sealing element is significantly increased.

Also with an embodiment in which the hard component is slotted substantially perpendicularly to the edge region from the outer door skin up to the material weakening with uniform and/or non-uniform spacing, excellent adaptation of the sealing element to the three-dimensional contour of the side door of the motor vehicle is enabled.

With the embodiment in which the slots are filled with the soft component, the stability of the sealing element is also significantly increased. Furthermore, as a result of this embodiment, a penetration of dirt or liquids into the region of a tolerance-related potential gap in the edge region is also avoided.

The embodiment in which the hard component and the inner door panel have corresponding openings for the securing elements is a preferred and cost-effective embodiment.

The embodiment in which a plurality of openings are provided for the securing elements and the openings have a uniform and/or non-uniform spacing with respect to each other and are arranged along and with spacing from the edge region, a simple and completely fitting assembly of the sealing element on a side door of a motor vehicle is achieved.

Preferably, the securing elements are cost-effective screws and/or clips.

With the embodiment in which between the edge region and the openings there is arranged on the hard components a linear soft component which extends in the direction of the inner door panel and along the edge region and in the assembled state is supported on the inner door panel, a penetration of dirt or liquids into the edge region is also avoided if a securing element should not be cleanly sealed with the hard component.

The embodiment in which the edge region forms at least a portion of a wheel housing of the motor vehicle, is a particularly preferred exemplary embodiment.

The embodiments in which the soft component is injection-molded or vulcanized onto the hard component and/or is fitted adjacent to the edge region as a separate component are preferred and cost-effective production methods.

The embodiment in which the hard component and the soft component do not extend into the gap between the inner door panel and the outer door skin again reduces the production costs of the sealing element significantly.

The invention is explained in greater detail below with reference to the figures.

BRIEF DESCRIPTION OF THE DRAWINGS

FIG. 1 shows a cut-out of a side view of a motor vehicle;

FIG. 2 is a section view in the X-Y direction through a side door of the motor vehicle which is subjected to tolerances;

FIG. 3 is a section view in the X-Y direction through the side door of the motor vehicle without tolerances;

FIG. 5 is a section view in the X-Y direction through the side door of the motor vehicle for a second exemplary embodiment.

In FIGS. 1 to 5 below, the same reference numerals apply to the same components.

DETAILED DESCRIPTION OF THE DRAWINGS

Figure 4:
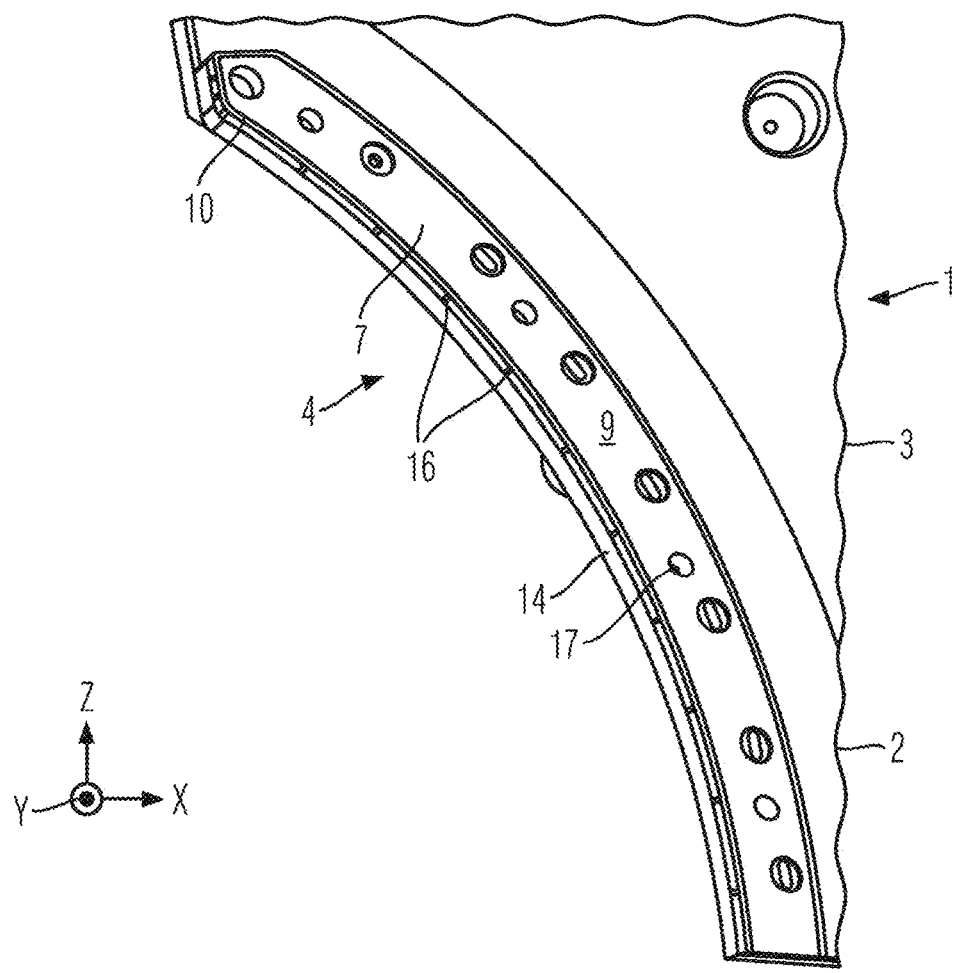
FIG. 4 is a plan view of an edge region of the side door of the motor vehicle.

FIG. 1 shows a cut-out of a side view of a motor vehicle (no reference numerals) having a side door 1. A section A-A, which is illustrated with dot-dash lines, extends through the side door 1 and a wheel housing 8 of the motor vehicle. Below FIG. 1, an associated coordinate system is illustrated, wherein X corresponds to a longitudinal direction of the motor vehicle, Z corresponds to a vertical direction of the motor vehicle and Y corresponds to a transverse direction of the motor vehicle. The Y direction is orientated substantially normally with respect to the drawing plane and faces downward, away from a viewer.

FIG. 2 shows an X-Y section through the side door 1 of the motor vehicle 2 according to the section A-A from FIG. 1. Under FIG. 2, the corresponding coordinate system is again illustrated with the longitudinal direction X, the transverse direction Y and the vertical direction Z of the motor vehicle. In FIG. 2, the vertical direction Z is substantially perpendicular to the plane of the drawing and is directed upward in the direction of an observer.

The side door 1 has at the motor vehicle inner side, that is to say, at a side facing the passenger space, an inner door panel 2 and at the motor vehicle outer side an outer door skin 3. The outer door skin 3 may, for example, also be produced from a metal sheet or from a plastics material or from a material mix. The inner door panel 2 and the outer door skin 3 are at least partially butt-jointed in an edge region 4 of the side door 1. In the edge region 4, a gap 5 is formed at least partially as a result of tolerances in the Y direction and/or the X-Z direction between the inner door panel 2 and the outer door skin 3. This gap 5 is intentionally illustrated to an excessively large scale in order to make it readily identifiable. Two vertical dot-dash lines in the region of the gap 5 show possible tolerances in the X-Z direction. Two additional horizontal dot-dash lines in the X direction show possible tolerances in the Y direction. Furthermore, there is provided a sealing element 7 which can be secured by means of securing elements 6 to the inner door panel 2 and which extends over the edge region 4 and is positioned in each case in a sealing manner on the inner door panel 2 and the outer door skin 3 at the outer side.

The securing elements 6 may, for example, be cost-effective screws and/or clips. In order to secure the sealing element 7, a plurality of openings 17 for the securing elements 6 are provided in the inner door panel 2 and the sealing element 7, wherein the openings 17 may have a uniform and/or non-uniform spacing with respect to each other and are arranged along and with spacing from the edge region 4. FIG. 2 only illustrates a single opening 17 in the inner door panel 2 and the sealing element 7 in each case.

According to an embodiment of the invention, the sealing element 7 is formed by a hard component 9 which extends along the edge region 4, wherein there is arranged only at the inner door panel side and outer door skin side on the hard component 9 a soft component 10 which is positioned in each case on the inner door panel 2 and the outer door skin 3 at the outer side adjacent to the edge region 4 in the secured state of the sealing element 7.

Furthermore, in the present exemplary embodiment, the outer door skin 3 is flanged in the edge region 4 at the side facing the inner door panel 2, whereby the sealing element 7 can advantageously also be used for flanged edges. Consequently, for flanged edges effective protection for the edge region is also constituted and occurrences of flaking paint and corrosion are also advantageously reliably avoided at flanged edges.

Furthermore, the soft component 10 is at least partially in abutment against the inner door panel 2 with a first base 11 and against the outer door skin 3 with a second base 12 along the edge region 4. As a result of this embodiment, the sealing element 7 has in the installed state a position which is defined in the Y direction with respect to the inner door panel 2. This first base 11 or second base 12 may in a first exemplary embodiment be configured only partially along the edge region 4, whereby weight and costs are saved, or continuously so that the sealing element 7 is positioned along the edge region 4 completely on the inner door panel 2 and the outer door skin 3. This embodiment increases the stability of the sealing element 7.

In the present exemplary embodiment, the soft component 10 has adjacent to the first base 11 a first sealing lip 13 which is positioned on the inner door panel 2 and a second sealing lip 14 which is arranged adjacent to the second base 12 and which is positioned at least partially in a sealing manner on the outer door skin 3, and which both extend along the edge region 4. In another exemplary embodiment, only a single sealing lip 13, 14 may also be provided, whereby the sealing action of the sealing element 7 is reduced accordingly, however. Furthermore, the first sealing lip 13 and/or the second sealing lip 14 as in the present exemplary embodiment may extend along the entire edge region 4. In another exemplary embodiment, the first sealing lip 13 and the second sealing lip 14 may also extend only partially along the edge region 4.

Furthermore, in the present exemplary embodiment, the hard component 9 has a material weakening 15 along the edge region 4 in the region of the joint of the inner door panel 2 and outer door skin 3 at the side facing away from the inner door panel 2. This is in the present exemplary embodiment at least partially filled with the soft component 10. This embodiment facilitates the adaptation of the sealing element 7 to a three-dimensional geometry of the side door 1. The stabilizing soft component 10 within the material weakening provides in the installed state an improved component strength. In another exemplary embodiment, the soft component 10 in the material weakening 15 may also partially be omitted.

The hard component is, for example, intended to be understood to be polypropylene (PP). The soft component is, for example, intended to be understood to be a thermoplastic polymer (PET) or a rubber material, such as, for example, ethylene-propylene-diene rubber (EPDM).

In the present exemplary embodiment, there is further arranged between the edge region 4 and the openings 17 on the hard component 9 a linear soft component 10 which extends in the direction of the inner door panel 2 along the hard region 4 and in the assembled state is supported on the inner door panel 2. This embodiment prevents the penetration of dirt and liquids if a complete sealing should not be achieved between the securing element 6 and the hard component 9.

In the present exemplary embodiment, the edge region 4, as can be seen in FIG. 4, forms at least one portion of a wheel housing 8 of the motor vehicle. In this instance, this is a preferred embodiment of the motor vehicle and the side door 1.

For a cost-effective production of the sealing element 7, the soft component 10 is preferably injection-molded onto the hard component 9 and/or fitted adjacent to the edge region 4 as a separate component 18 (see FIG. 5).

With the embodiment that the hard component 9 and the soft component 10 do not extend into the gap between the inner door panel 2 and the outer door skin 3, a very cost-effective production of the sealing element 7 is also achieved.

FIG. 3 shows the section in an X-Y direction through the side door 1 of the motor vehicle from FIG. 2, but without visible tolerances.

FIG. 4 shows a plan view of a sealing element 7 illustrated in a three-dimensional manner. The inner door panel is again designated 2 and the outer door skin is designated 3. The sealing element 7 extends in the edge region 4 of the side door 1. At the left beside FIG. 4, the associated coordinate system is illustrated again, wherein Z again represents the vertical direction of the vehicle, X represents the longitudinal direction of the motor vehicle and Y represents the transverse direction of the motor vehicle. In this coordinate system, in contrast to FIG. 1, the transverse direction Y is orientated perpendicularly to the drawing plane and extends in the direction of the viewer.

In FIG. 4, the soft component 10 can be easily seen in the material weakening 15. Furthermore, FIG. 4 shows the slots 16 which are introduced substantially perpendicularly to the edge region 4 from the outer door skin 3 into the vicinity of the material weakening 15 with uniform spacings. In another exemplary embodiment, the slots 16 can also be spaced apart in a uniform and/or non-uniform manner. The slots 16 are in the present exemplary embodiment also filled with the soft component 10. As a result of this configuration, the sealing element 7 can be geometrically outstandingly adapted to the three-dimensional configuration of the side door 1, wherein the soft component 10 in the slots 16 and the material weakening 15 provides the sealing element 7 with a high degree of stability.

FIG. 5 shows a section in the X-Y direction through the side door 1 of the motor vehicle, according to FIG. 3, for a second exemplary embodiment. In this exemplary embodiment, the soft component 10 is partially injection-molded onto the hard component 9 and fitted adjacent to the edge region 4 as a separate component 18. An internal reinforcement of the soft component 10 is not given a reference numeral. In this embodiment, the second sealing lip 14 is formed by the soft component 10 which is fitted to the hard component 9. In order to act counter to the separate component 18 unintentionally falling down, locking projections which are not given reference numerals are provided both on the hard component 9 and on the soft component 10.

As a result of the configuration according to the invention of the motor vehicle with the side door 1, a cost-effective, effective protection for the edge region is constituted and occurrences of flaking paint and corrosion are also avoided in flanged edges.

LIST OF REFERENCE NUMERALS

1 Side door
2 Inner door panel
3 Outer door skin
4 Edge region
5 Gap
6 Securing element
7 Sealing element
8 Wheel housing
9 Hard component
10 Soft component
11 First base
12 Second base
13 First sealing lip
14 Second sealing lip
15 Material weakening
16 Slot
17 Opening
18 Separate component
X Longitudinal direction
Y Transverse direction
Z Vertical direction

What is claimed is:

1. A motor vehicle, comprising:
a side door which, at a motor vehicle inner side, has an inner door panel and, at a motor vehicle outer side, has an outer door skin, wherein
the inner door panel and the outer door skin are at least partially joined in abutment in an edge region of the side door,
in the edge region, at least partially as a result of tolerances in a Y direction and/or an X direction, a gap is formable between the inner door panel and the outer door skin,
a sealing element is secured to the inner door panel via securing elements, and extends over the edge region and is positioned on the inner door panel and the outer door skin, in each case, in a sealing manner at an outer side,
the sealing element is formed from a hard component which extends along the edge region, and
a soft component is arranged only at the inner door panel side and at the outer door skin side on the hard component, the soft component being positioned in a sealing manner on the inner door panel and the outer door skin, in each case, at the outer side adjacent to the edge region in a secured state of the sealing element,
wherein the hard component has a material weakening along the edge region in the region of a joint of the inner door panel and the outer door skin at a side facing away from the inner door panel, and wherein the hard component includes slots disposed substantially perpendicularly to the edge region from the outer door skin up to the material weakening with uniform spacings.

2. The motor vehicle according to claim 1, wherein the outer door skin is flanged in the edge region at the side facing the inner door panel.

3. The motor vehicle according to claim 1, wherein the soft component is positioned at least partially in abutment against the inner door panel with a first base and against the outer door skin with a second base along the edge region.

4. The motor vehicle according to claim 3, wherein the soft component includes a first sealing lip adjacent to the first base and a second sealing lip disposed on the inner door panel and/or adjacent to the second base, the second sealing lip being positioned at least partially in a sealing manner on the outer door skin and extending along the edge region.

5. The motor vehicle according to claim 1, wherein the material weakening is at least partially filled with the soft component.

6. The motor vehicle according to claim 1, wherein the slots are filled with the soft component.

7. The motor vehicle according to claim 1, wherein the hard component and the inner door panel have corresponding openings for the securing elements.

8. The motor vehicle according to claim 7, wherein a plurality of said openings are provided for the securing elements, and the openings have a uniform and/or non-uniform spacing with respect to each other and are arranged along, and with spacing from, the edge region.

9. The motor vehicle according to claim 7, wherein the securing elements are screws and/or clips.

10. The motor vehicle according to claim 7, wherein between the edge region and the openings, a linear soft component is arranged on the hard component, which extends in the direction of the inner door panel, along the edge region, and in an assembled state is supported on the inner door panel.

11. The motor vehicle according to claim 1, wherein the edge region forms at least a portion of a wheel housing of the motor vehicle.

12. The motor vehicle according to claim 1, wherein the soft component is injection-molded or vulcanized onto the hard component and/or is fitted adjacent to the edge region as a separate component.

13. The motor vehicle according to claim 1, wherein the hard component and the soft component do not extend into the gap between the inner door panel and the outer door skin.

* * * * *